Aug. 19, 1930.  L. A. ETCHISON ET AL  1,773,451
PLANT SETTER
Filed Aug. 7, 1928   4 Sheets-Sheet 4
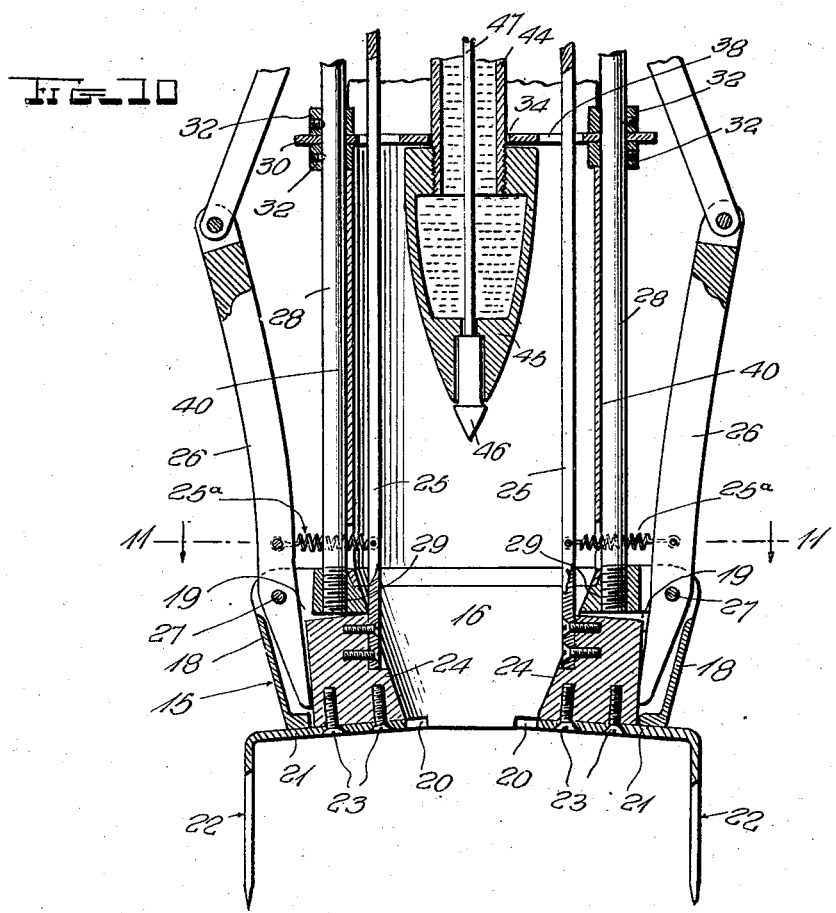
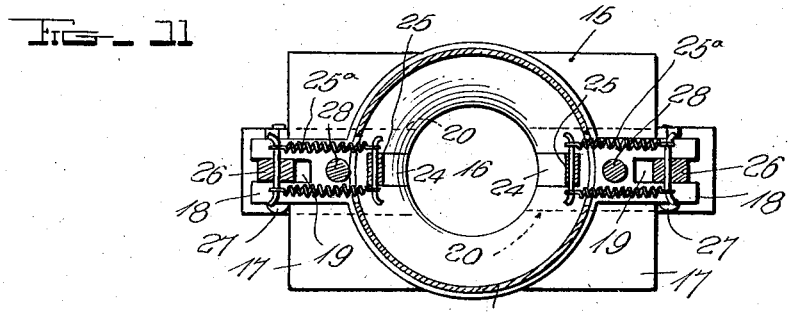
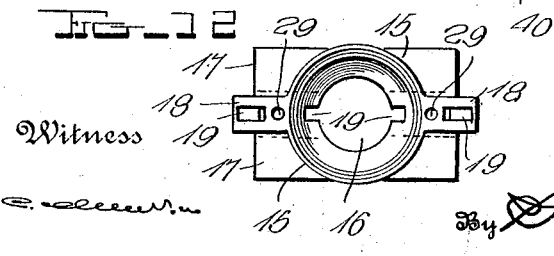
Inventors
Lewis A. Etchison,
Richard A. Neely, Patented Aug. 19, 1930

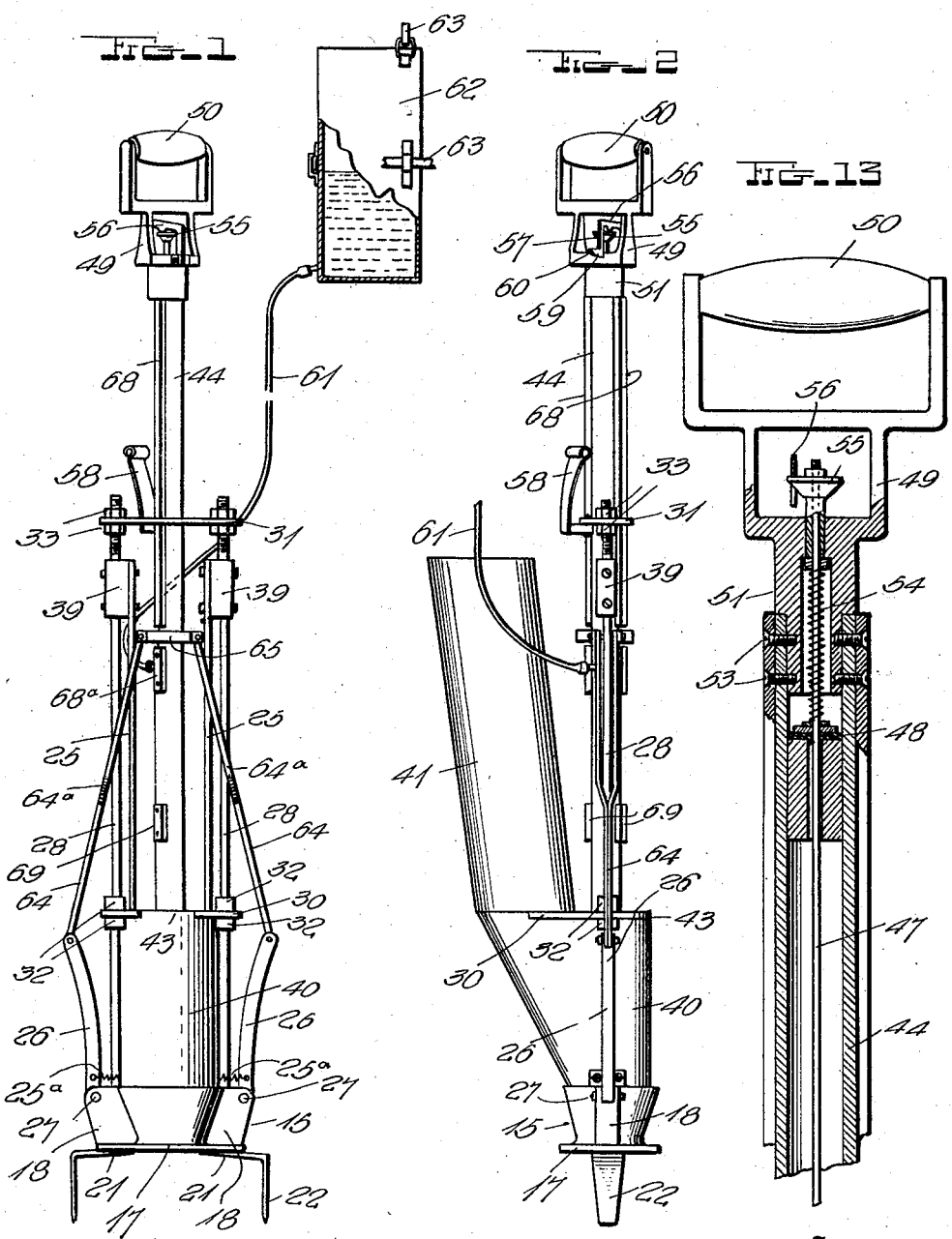

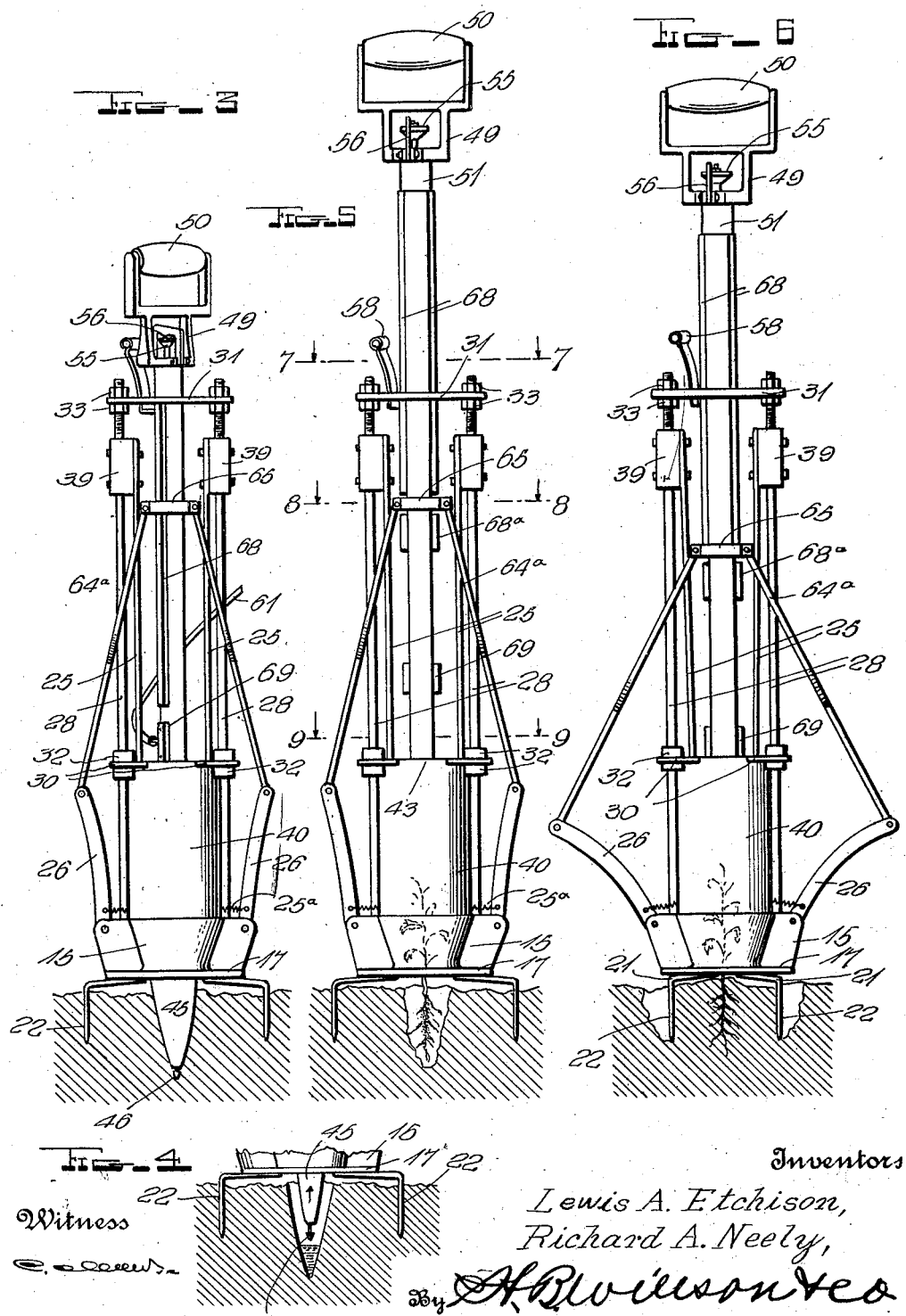

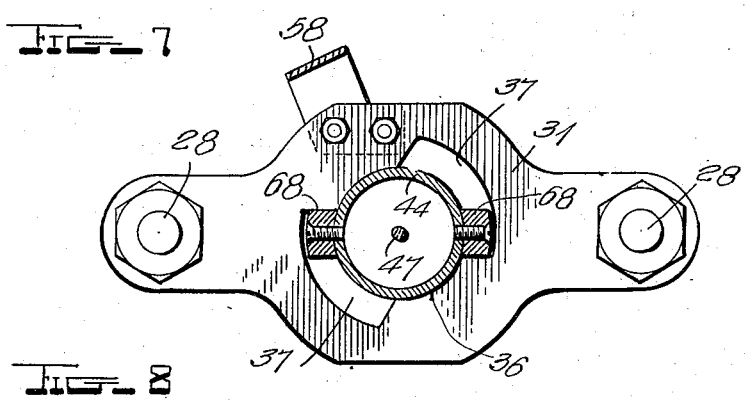
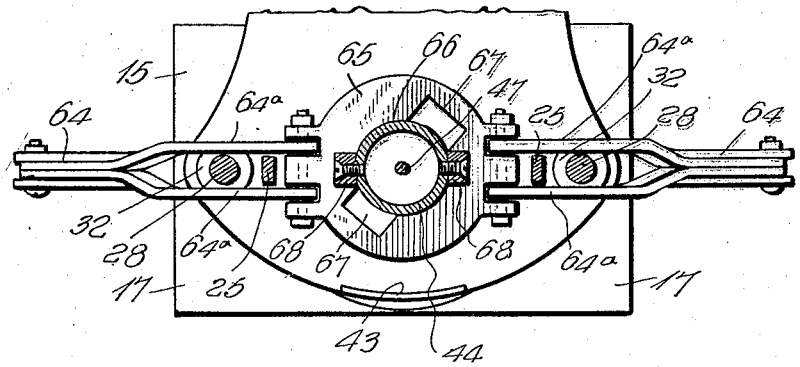
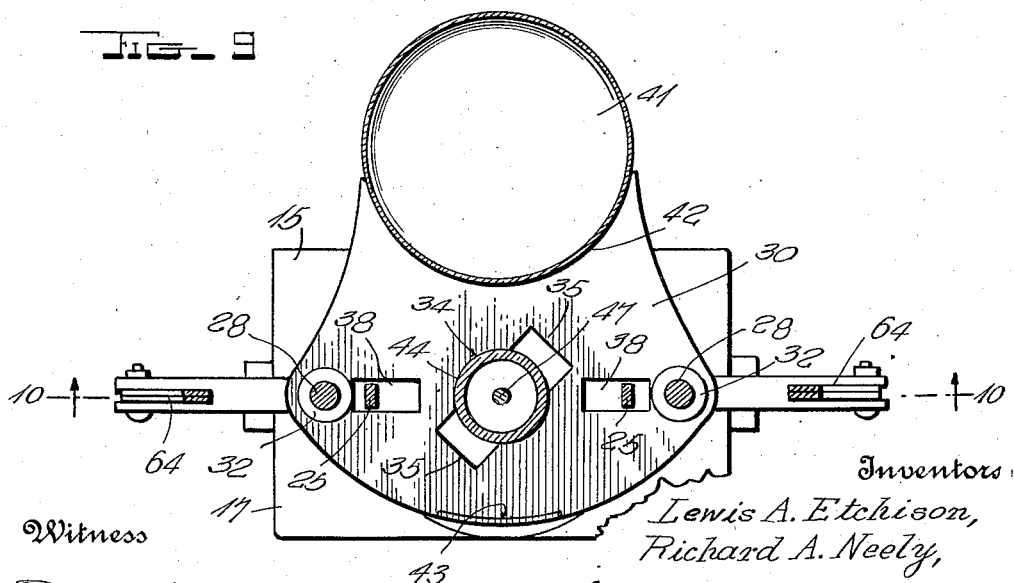

1,773,451

UNITED STATES PATENT OFFICE.

LEWIS A. ETCHISON, OF CANA, AND RICHARD A. NEELY, OF MOCKSVILLE, NORTH CAROLINA, ASSIGNORS OF NINE-TENTHS TO SAID NEELY AND ONE-TENTH TO N. C. GRUBBS, OF FORSYTH COUNTY, NORTH CAROLINA

PLANT SETTER

Application filed August 7, 1928. Serial No. 297,924.

The invention relates to plant setters of the general type shown in the U. S. application of Lewis A. Etchison, Serial No. 239,521, filed December 12, 1927, and refiled January 24, 1930 as Serial No. 423,229.

It is one object of the invention to provide a generally improved and condensed construction which can be more advantageously operated by unskilled labor.

Further objects are to provide improved packing or hole-closing means, to provide improved operating means for the water valve of the hole-forming plunger and to provide a construction in which the necessary movements of the plunger to form a hole, water this hole and close the hole around a plant, are lessened.

Yet another aim is to provide a construction which may be more expeditiously manufactured and marketed.

With the foregoing in view, the invention resides in the novel subject matter hereinafter described and claimed, description being supplemented by the accompanying drawings.

Figure 1 is a front elevation partly broken away and in section showing the normal relation of parts.

Fig. 2 is a side elevation with parts related as in Fig. 1.

Fig. 3 is a front elevation showing the plunger depressed to the maximum for the formation of a plant-receiving hole in the earth.

Fig. 4 is a detail elevation partly in section illustrating the manner in which water is discharged into the hole upon return of the plunger to raised position.

Fig. 5 is a front elevation showing the plunger raised and turned in readiness for effecting the hole-closing operation around the plant which has been dropped into the hole.

Fig. 6 is a view similar to Fig. 5 but illustrating the plunger depressed and the hole-closing means in operation.

Figs. 7, 8 and 9 are horizontal sectional views on the correspondingly numbered lines of Fig. 5.

Fig. 10 is an enlarged vertical sectional view on line 10—10 of Fig. 9.

Fig. 11 is a horizontal sectional view on line 11—11 of Fig. 10.

Fig. 12 is a top plan view of the base with associated parts detached.

Fig. 13 is an enlarged vertical sectional view through the upper end of the plunger.

The drawings above briefly described illustrate the preferred form of construction and while this construction will be herein specifically explained, it is to be understood that within the scope of the invention as claimed, variations may be made.

The machine embodies a base 15 having a central downwardly tapered opening 16 through which a plunger is movable to form a plant-receiving opening in the earth, the plant when dropped being also movable through said opening. The lower portion of the base 15 is preferably provided with outstanding plates or flanges 17, any of which may be depressed with the foot to force the machine initially into the soil, should this be necessary. At diametrically opposite points, lugs 18 are shown on the base, projecting outwardly therefrom, these lugs being formed with recesses 19 which open through the inner side of the base, through the bottom of the latter and through its top, but not at the outer ends of the lugs. The bottom of the base is formed with radial grooves 20 communicating with the recesses 19 and of greater width than the latter. Slidable in these grooves, are the upper portions 21 of a pair of inverted L-shaped hole-closers 22. The portions 21 are detachably secured by screws 23 to metal blocks 24 which are snugly yet slidably received in the recesses 19. The portions 21 of the hole-closers 22 are wider than the blocks 24 so that they project laterally from the latter in opposite directions, and these laterally projecting portions being rather snugly received in the grooves 20, assist materially in preventing entrance of dirt into the recesses 19, from the lower side of the base, thereby assisting in assuring easy operation of the blocks 24 when the hole-closers 22 are to be inwardly moved as seen in Fig. 6. The blocks 24 are carried by the lower ends of upright spring arms 25 mounted in a manner hereinafter described, and for inwardly forcing said blocks against the tension of these spring arms, vertical levers 26 are provided. The lower ends of these levers extend into the outer portions of the recesses 19 and are fulcrumed therein as indicated at 27. The lower extremities of these levers contact with the outer ends of the blocks 24 so that upon outward forcing of the upper ends of said levers, said blocks and the hole-closers 22 will be forced inwardly.

Two vertical rods 28 rise rigidly from the base 15, the lower ends of these rods being preferably threaded into sockets 29 in the upper side of said base. Extending between the lower and upper portions of the rods 28, respectively, are lower and upper plunger guiding plates 30—31 each of which is formed with openings through which the rods pass. Collars 32 have been shown on the rods 28 in contact with the upper and lower sides of the plate 30 for holding the latter in fixed position. Nuts 33 are illustrated on these rods in contact with the upper and lower sides of the plate 31 for securing the latter. The plate 30 is formed with a central plunger-receiving opening 34 and with opposed notches 35 communicating with said opening. Similarly, plate 31 is formed with a central plunger-receiving opening 36 and with relatively long notches 37 communicating with this opening. The plate 30 is also formed with slots 38 between the rods 28 and the opening 34, and the spring arms 25 pass through these slots, the upper ends of said spring arms being secured to appropriate blocks 39 which are mounted in any desired way upon the rods 28. These spring arms are disposed at the inner sides of the rods 28 so that a rather condensed structure is produced. Then too, the lower portions of the spring arms 25 are within a tubular, offset, lower portion 40 of a plant chute 41. The lower end of the portion 40 is received in the upper end of the opening 16 and the upper end of said portion 40 is closed by the plate 30. This plate preferably has a notch 42 receiving the portion of the plant chute adjacent the upper end of the part 40, and said upper end of part 40 is by preference provided with an upstanding lip 43 abutting the front edge of the plate 30. By this construction, the chute is effectively secured in place.

A tubular plunger 44 is slidably received in the openings 34 and 36 of the plates 30 and 31 respectively. The lower end of this plunger is formed with a spear head 45 disposed within the chute portion 40 and downwardly movable through the opening 16 to form a hole in the earth as shown in Fig. 3. The spear head 45 is provided with a water valve 46 and provision is made for opening this valve as the plunger is raised (see Fig. 4). Thus, a quantity of water is discharged into the hole in the earth in readiness for reception of the plant.

A valve operating rod 47 is secured to and rises from the valve 46. The upper end of this rod passes through appropriate packing means 48 and extends into a yoke 49 on an operating handle 50 with which the plunger 44 is provided.

Yoke 49 is formed with a tubular, downward extension 51 which is secured in the upper end of the plunger 44 by screws or the like 53, and in this extension, an appropriate spring 54 is housed for normally forcing upward upon the rod 47 to hold the valve 46 in closed position. A collar 55 is secured upon the rod 47 within the yoke 49, and a valve operating lever 56 which is fulcrumed in said yoke, rests upon this collar as shown in a number of the views. This lever 56 is provided with a down-turned free end 57 cooperable with a spring 58 which is secured to the plate 31, for the purpose of effecting operation of the valve 46. The spring 58 projects upwardly from the plate 31, the lever end 57 is provided with a cam 59 which merely outwardly springs said spring 58 upon descent of the plunger 44, and said lever end 57 is provided with a pointed nose 60 adapted to temporarily catch upon the spring 58 upon ascent of the plunger. Thus, when the plunger descends to form the opening in the earth as seen in Fig. 3, the valve 46, is not molested. However, when the plunger 44 is again lifted, the nose 60 of the lever 56 catches upon the spring 58, thereby effecting movement of the lever 56 and depression of the rod 47 to momentarily open the valve 46. Hence, a predetermined quantity of water is discharged from the plunger 44 into the hole in the earth. Water may of course be fed to the plunger 44 by any desired means. For this purpose, a flexible hose 61 is shown leading from a tank 62 which is carried by the operator, an appropriate harness being provided for easily carrying said tank. Portions of this harness are indicated at 63 on the drawing.

Two links 64 are pivoted to and converge upwardly from the levers 26, the upper ends of said links being pivoted to a collar 65 through which the plunger 44 passes slidably. The links 64 are provided with bifurcated portions 64ª which straddle the rods 28, thereby holding the links in such positions as to prevent rotation of the collar 65. This collar is shown in plan view in Fig. 8 and it will be observed from this view that said collar is formed with a central opening 66 receiving the plunger 44 and is provided also with opposed notches 67 registering with said opening. Two longitudinal ribs 68 are secured to the plunger 44 and these ribs pass through the notches 37 of the opening 36 in the plate 31. When the plunger 44 is completely raised and is in readiness for the hole-forming operation as seen in Fig. 1, the lower ends of the ribs 68 are disposed in alinement with the notches 67 in the collar 65. Hence, upon depression of the plunger 44 the ribs 68 will merely pass through the notches 67 and the collar 65 will not be depressed. During this hole-forming descent of the plunger 44, two stop lugs 69 secured to the lower portion of the plunger 44, pass through the notches 35 of the plate 30 and do not interfere with maximum depression of the plunger to properly form the hole in the earth.

During the above-mentioned hole-forming depression of the plunger 44, the valve-operating lever 56 causes the spring 58 to yield outwardly. Upon return of the plunger however the spring actuates the lever 56 to momentarily open the water valve 46 as above explained. Upward movement of plunger 44 is limited by the spear head 45 striking the plate 30 as seen in Fig. 10, and with the plunger in this position, a plant is dropped down the chute 41 so that it falls through the opening 16 into the hole formed in the earth (see Fig. 5). Either before or after dropping the plant, the entire plunger is turned so that the ribs 68 overlie the collar 65 as shown for instance in Figs. 5 and 8. In this connection, it may be explained that the ribs 68 coact with the end walls of the notches 37 (plate 31) in limiting the turning of the plunger. When this plunger is now depressed, the ribs 68 similarly depress the collar 65, thereby causing the links 64 to outwardly swing the levers 26 as shown in Fig. 6, with the result that these levers effect inward movement of the hole-closers 22 as shown in this view. The earth is thus drawn inwardly around the roots of the plant and is packed with the desired amount of firmness. Upon descent of the plunger to effect the hole closing operation, its descent is limited by contact of the stops 69 with the upper side of the plate 31 as shown in Fig. 6.

Raising of the plunger 44 after actuation of the hole-closers 22, effects raising of the collar 66 by virtue of two auxiliary ribs 68ª on said plunger which at that time abut the lower side of said collar. This ascent of the collar restores the links 64 and levers 26 to their normal positions, and they are held in these positions by the resiliency of the arms 25, as well as by appropriate springs 25ª suitably connected to the levers 26 at one end and to said arms 25 at the other end (see Figs. 10 and 11).

By the construction herein described and illustrated, a generally improved and condensed machine is provided which may be more easily operated and in which there is no danger of the operator becoming confused and performing any operations out of proper sequence.

We claim:

1. A plant setter comprising a base having an opening, a vertically elongated hole-forming plunger downwardly movable through said opening, vertical rods rising rigidly from said base, a horizontal plate secured to the upper ends of said rods and having an opening through which said plunger passes slidably, a plant chute having a tubular portion rising from the base, said tubular chute portion surrounding and being spaced from the lower portion of said plunger, vertical arms passing through said tubular chute portion and having their upper ends connected with said rods, the lower ends of said arms having radially slidable hole closers projecting downwardly from the base, vertical levers for inwardly moving the lower ends of said arms, the base being formed with upwardly opening recesses in which the lower ends of said levers are fulcrumed in operative relation with said arms, upwardly converging links pivoted to the upper ends of said levers, a plunger-encircling collar to which the upper ends of said links are pivoted, and a longitudinal collar-depressing rib on said plunger whose lower end is engageable with the upper side of said collar upon pre-determined turning of said plunger, said collar and said plate having internal notches through which said rib is slidable, the ends of the notch of said plate coacting with said rib in limiting the turning of said plunger.

2. A plant setter comprising a base having an opening, a vertically elongated tubular plunger slidable downwardly through said opening to form a hole in the earth, the lower end of said plunger having a water discharge valve, means for supplying water to said plunger, an operating rod rising from said valve and an operating member for said rod projecting laterally from the plunger, vertical rods rising rigidly from the base, a horizontal plate secured to said rods and having an opening through which said plunger passes slidably, and a spring mounted on said plate for depressing said operating member and the valve operating rod upon lifting of the plunger after performing the hole-forming operation.

3. A plant setter comprising a base having an opening, a vertically elongated tubular plunger slidable downwardly through said opening to form a hole in the earth, the lower end of said plunger having a water discharge valve, means for supplying water to said plunger, an operating rod rising from said valve and an operating member for said rod projecting laterally from the plunger, vertical rods rising rigidly from the base, a horizontal plate secured to said rods and having an opening through which said plunger passes slidably, a spring mounted on said plate for depressing said operating member and the valve-operating rod upon lifting of plunger after performing the hole-forming operation, a plant chute having a tubular portion rising from the base, said tubular chute portion surrounding and being spaced from the lower portion of said plunger, vertical arms passing through said tubular chute portion and having their upper ends connected with said rods, the lower ends of said arms having radially slidable hole closers projecting downwardly from the base, vertical levers for inwardly moving the lower ends of said arms, the base being formed with upwardly opening recesses in which the lower ends of said levers are fulcrumed in operative relation with said arms, upwardly converging links pivoted to the upper ends of said levers, a plunger-encircling collar to which the upper ends of said links are pivoted, and a longitudinal collar-depressing rib on said plunger whose lower end is engageable with the upper side of said collar upon pre-determined turning of said plunger, said collar and said plate having internal notches through which said rib is slidable, the ends of the notch of said plate coacting with said rib in limiting the turning of said plunger.

4. A plant setter comprising a body including a base having an opening, said body being provided with plunger-guiding means above said base, a vertically elongated hole-forming plunger slidable in said guiding means and movable downwardly through said opening, a plant chute secured to said body and extending in said opening, radially movable hole closers mounted on said body and projecting downwardly from said base, vertical levers fulcrumed on said body in operative relation with said hole closers for moving the latter inwardly upon outward swinging of said levers, upwardly converging links pivoted at their lower ends to the upper ends of said levers, a collar to which the upper ends of said links are pivoted, said collar having an internal notch, and a shoulder on the plunger movable downwardly through said notch upon the hole-forming movement of said plunger, said shoulder being positioned to abut the upper side of said collar by turning of the plunger after return of the latter upon completion of the hole, whereby a second depression of said plunger will actuate said collar, links and levers to operate the aforesaid hole closers.

5. A plant setter comprising a base having an opening, two rods rising rigidly from said base at opposite sides of said opening, a plunger guide secured to said rods, a hole forming plunger slidable in said guide and downwardly projectable through said opening, radially movable hole closers projecting downwardly from the base, vertical levers fulcrumed on said base in operative relation with said hole closers for inwardly moving the latter when said levers are outwardly swung, upwardly converging links whose lower ends are pivoted to the upper ends of said levers, a collar to which the upper ends of said links are pivoted, said links having portions straddling said rods to hold the collar against rotation, and a shoulder on said plunger, said collar having an internal notch through which said shoulder is movable upon hole-forming depression of the plunger, said shoulder being positioned to abut the upper side of the collar by turning of the plunger after return of the latter upon completion of the hole, whereby a second depression of the plunger will actuate said collar, links and levers to operate the aforesaid hole closers.

6. A plant setter comprising a base having an opening, two rods rising rigidly from said base at opposite sides of said opening, a plunger guide secured to the upper ends of said rods, said guide having an opening and a notch communicating with the latter, a hole-forming plunger slidable through said openings of said base and guide, radially movable hole closers projecting downwardly from the base, vertical levers fulcrumed on said base in operative relation with said hole closers for inwardly moving the latter upon outward swinging of the levers, links pivoted to and converging upwardly from said levers, said links having portions straddling said rods, a plunger-encircling collar to which the upper ends of said links are pivoted, said collar having an internal notch, and a longitudinal rib on said plunger movable through the notches of said plunger guide and collar upon hole-forming depression of the plunger, turning of said plunger to a limit permitted by the rib and the notch of the plunger guide after return of said plunger serving to position the lower end of said rib over said collar, whereby a second depression of the plunger will actuate said collar, links and levers to operate the aforesaid hole closers.

7. A plant setter comprising a base having an opening, two rods rising rigidly from said base at opposite sides of said opening, a plant chute having an offset tubular portion at its lower end received between said rods and resting on said base in communication with said opening, a plate resting on and closing the upper end of said offset chute portion, said plate having openings in which said rods are secured and slots spaced inwardly from said openings, a second plate secured to said rods above the first named plate, the two plates having plunger receiving openings, a hole-forming plunger slidable through the plate openings and downwardly movable through the opening of said base, radially movable hole closers projecting downwardly from said base, vertical arms passing through the aforesaid slots and connected at their lower ends with said hole closers, said arms being disposed at the inner sides of said rods and connected at their upper ends to the latter, and plunger-actuated means for inwardly forcing said hole closers.

8. A plant setter comprising a base having an opening, two rods rising rigidly from said base at opposite sides of said opening, a plant chute having an offset tubular portion at its lower end received between said rods and resting on said base in communication with said opening, a plate resting on and closing the upper end of said offset chute portion, said plate having openings in which said rods are secured and slots spaced inwardly from said openings, a second plate secured to said rods above the first named plate, the two plates having plunger receiving openings, a hole-forming plunger slidable through the plate openings and downwardly movable through the opening of said base, radially movable hole closers projecting downwardly from said base, vertical arms passing through the aforesaid slots and connected at their lower ends with said hole closers, said arms being disposed at the inner sides of said rods and connected at their upper ends to the latter, a collar loose on the plunger above said plate and normally free of connection with said plunger, means on said plunger for engaging said collar to depress the same upon predetermined turning of said plunger, means operable by depression of said collar for inwardly moving said hole closers, and a stop on the plunger adapted to strike the first named plate and limit the collar-depressing movement of the plunger, said plate having a notch through which said stop is movable upon hole-forming depression of the plunger.

9. A plant setter comprising a base having an opening, two rods rising rigidly from said base at opposite sides of said opening, a plant chute having an offset tubular portion at its lower end received between said rods and resting on said base in communication with said opening, a plate resting on and closing the upper end of said offset chute portion, said plate having openings in which said rods are secured and slots spaced inwardly from said openings, a second plate secured to said rods above the first named plate, the two plates having plunger receiving openings, a hole-forming plunger slidable through the plate openings and downwardly movable through the opening of said base, radially movable hole closers projecting downwardly from said base, vertical arms passing through the aforesaid slots and connected at their lower ends with said hole closers, said arms being disposed at the inner sides of said rods and connected at their upper ends to the latter, a collar loose on the plunger above said plate and normally free of connection with said plunger, means on said plunger for engaging said collar to depress the same upon predetermined turning of said plunger, means operable by depression of said collar for inwardly moving said hole closers, a stop on the plunger adapted to strike the first named plate and limit the collar-depressing movement of the plunger, said plate having a notch through which said stop is movable upon hole-forming depression of the plunger, and a second stop on said plunger to strike the lower side of said first named plate and limit the ascent of the plunger.

10. A structure as specified in claim 8; said second plate and said plunger having coacting portions for limiting the turning of the plunger.

11. A structure as specified in claim 9; said second plate and said plunger having coacting portions for limiting the turning of the plunger.

12. A plant setter comprising a body having a base formed with a vertical opening and radial recesses communicating with said opening, a hole forming plunger mounted on the body and downwardly movable through said opening, radially movable blocks in said recesses, hole-closing devices carried by said blocks and projecting downwardly beyond the base, and means for inwardly moving said blocks.

13. A plant setter comprising a body having a base formed with a vertical opening and radial recesses communicating with said opening, a hole forming plunger mounted on the body and downwardly movable through said opening, radially movable blocks in said recesses, inverted L-shaped hole-closing devices whose upper portions are detachably secured against the lower sides of said blocks, and means for inwardly moving said blocks.

14. A structure as specified in claim 13; said upper portions of said hole-closing devices projecting laterally beyond the vertical sides of said blocks, the lower side of said base being grooved to receive said projecting portions to assist in excluding dirt from said recesses.

15. A plant setter comprising a body having a base formed with a vertical opening, the bottom of the base being provided with radial grooves opening into said opening, said body also having radial recesses over and communicating with said grooves, hole closers slidable in said grooves and projecting downwardly from the base, carrying means for said hole closers embodying portions in said recesses, a plunger mounted on the body and downwardly movable through said opening, and means for operating said carrying means to inwardly move said hole closers.

16. A plant setter comprising a body having a base formed with a vertical opening and radial recesses communicating with said opening, a hole-forming plunger mounted on the body and downwardly movable through said opening, radially movable blocks in said recesses, hole-closing devices carried by said blocks and projecting downwardly beyond the base, vertical levers whose lower ends are fulcrumed in the outer ends of said recesses and bear against the outer sides of said blocks, and means for operating said levers to inwardly move said hole-closing devices.

17. A plant setter comprising a body having a base formed with a vertical opening and radial recesses communicating with said opening, a hole-forming plunger mounted on the body and downwardly movable through said opening, radially movable blocks in said recesses, hole-closing devices carried by said blocks and projecting downwardly beyond the base, vertical levers whose lower ends are fulcrumed in the outer ends of said recesses and bear against the outer sides of said blocks, and means for operating said levers to inwardly move said hole-closing devices, the base being provided with portions at the outer sides of said levers preventing dirt from entering the recesses at these points 18. A structure as specified in claim 17; said hole closing devices having portions projecting laterally beyond the opposed sides of said blocks, said base being grooved to receive said lateral portions, providing additional insurance against entrance of dirt.

19. In a plant setter, a plunger of tubular form having a pointed lower end provided with a water discharge valve, means for conducting water to said plunger, a valve operating rod rising from said valve through the plunger, a lever fulcrumed on said plunger and engaging said rod to depress the same and open the valve, a body on which the plunger is slidably mounted, and a spring secured to said body in the downward path of said lever, the latter having a cam nose for laterally forcing said spring upon descent of the plunger, and having also a portion to be temporarily caught by the spring upon ascent of said plunger, thereby depressing lever and rod to temporarily open the valve.

20. A structure as specified in claim 19; said plunger being provided at its upper end with a handle having a yoke, said lever being mounted in said yoke.

In testimony whereof we have hereunto affixed our signatures.

LEWIS A. ETCHISON.
RICHARD A. NEELY.